(12) United States Patent
Kitano et al.

(10) Patent No.: US 6,231,325 B1
(45) Date of Patent: May 15, 2001

(54) SCROLL-TYPE COMPRESSOR

(75) Inventors: Norio Kitano, Fujioka; Kanetsugu Tsurutani, Kuwana, both of (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/577,486

(22) Filed: May 25, 2000

(30) Foreign Application Priority Data

Jun. 1, 1999 (JP) .................................................. 11-153851

(51) Int. Cl.$^7$ .................................................. F03C 2/00
(52) U.S. Cl. .......................................... 418/55.3; 464/103
(58) Field of Search ............................ 418/55.3; 464/103

(56) References Cited

U.S. PATENT DOCUMENTS

| | | | | |
|---|---|---|---|---|
| 4,527,963 | * | 7/1985 | Terauchi | 418/55.3 |
| 5,738,504 | * | 4/1998 | Kitano | 418/55.3 |
| 5,758,978 | * | 6/1998 | Satoda et al. | 418/55.3 |
| 5,911,566 | * | 6/1999 | Terauchi et al. | 418/55.3 |
| 5,938,418 | * | 8/1999 | Iizuka | 418/55.3 |
| 6,139,293 | * | 10/2000 | Iizuka et al. | 418/55.3 |

FOREIGN PATENT DOCUMENTS

| | | | | |
|---|---|---|---|---|
| 61-205387 | * | 9/1986 | (JP) | 418/55.3 |
| 63-179185 | * | 7/1988 | (JP) | 418/55.3 |
| 1-167481 | * | 7/1989 | (JP) | 418/55.3 |
| 2-119691 | * | 5/1990 | (JP) | 418/55.3 |
| 3-085385 | * | 4/1991 | (JP) | 418/55.3 |
| 3-202689 | * | 9/1991 | (JP) | 418/55.3 |
| 9-310686 | * | 12/1997 | (JP) | 418/55.3 |

* cited by examiner

*Primary Examiner*—Thomas Denion
*Assistant Examiner*—Theresa Trieu
(74) *Attorney, Agent, or Firm*—Baker Botts L.L.P.

(57) ABSTRACT

A scroll-type compressor includes a fixed first scroll member, an orbital second scroll member, and a ball coupling provided as a rotation preventing mechanism for the second scroll member. The ball coupling has a pair of integrally formed rolling ball regulating plates and a plurality of balls disposed therebetween. The ball coupling is assembled in the compressor at a condition in that an axial preload is provided. The axial preload is set more than an axial force given by the balls to the rolling ball regulating plates during operation of the compressor for correcting deformation of the rolling ball regulating plates. When the compressor is assembled, an axial gap between the first and second scroll members may be properly adjusted. After the assembly and during the operation of the compressor, the behavior of balls may be stable.

5 Claims, 2 Drawing Sheets

SCROLL-TYPE COMPRESSOR

BACKGROUND OF THE INVENTION

1. Field of the Invention

The present invention relates to a scroll-type compressor.

2. Description of Related Art

A scroll-type compressor includes a first scroll member and a second scroll member within a housing. The first scroll member is provided as a fixed scroll member. The second scroll member is provided as an orbital scroll member for nonrotatable, orbital movement relative to the first scroll member. The rotation of the second scroll member is prevented by rotation preventing mechanism provided in the compressor. The first scroll member has a first end plate and a first spiral element which axially extends from the first end plate. The second scroll member has a second end plate and a second spiral element which axially extends from the second end plate. The first spiral element and the second spiral element interfit at an angular and radial offset to make a plurality of line contacts which define at least one pair of sealed off fluid pockets. The sealed off fluid pockets move radially inwards due to the nonrotatable, orbital movement of the second scroll member, and decrease in volume, thereby, compressing the fluid.

A ball coupling-type mechanism may be used as the rotation preventing mechanism for the second scroll member. In a usual ball coupling-type rotation preventing mechanism, a ring for regulating balls and thrust plates for receiving balls are made separately. In a rotation preventing mechanism having such a structure, a shim generally is used for adjusting an axial gap between the first and second scroll members. In this structure, by selecting an appropriate thickness of the shim, the compressor may be assembled, so that a preload is not generated in the rotation preventing mechanism and between the first and second scroll members within a range that does not affect the performance of the compressor.

A scroll-type compressor has been proposed that uses a rotation preventing mechanism, wherein the ring for regulating balls and the thrust plates for receiving balls are made integrally. Such a ball coupling has a pair of rolling ball regulating plates, each integrally formed as a ring-like plate, and a plurality of balls interposed between the rolling ball regulating plates. The ball coupling is disposed between the second scroll member and a fixed portion of the compressor, such as a front housing facing the second scroll member, so that the pair of rolling ball regulating plates axially face each other. Each rolling ball regulating plate has a plurality of ball rolling grooves that are disposed in the circumferential direction about the plate. Each ball rolling groove may be formed as a ring-like groove. Each ball is disposed between the respective ball rolling grooves of the respective plates, and rolls along the ball rolling grooves during the operation of the compressor for allowing the nonrotatable, orbital movement of the second scroll member. Such a ball coupling has a small number of parts.

However, the rolling ball regulating plate of such a ball coupling generally has a problem that a deformation, such as a distortion or a torsion, is easily generated. For example, a torsion of a single rolling ball regulating plate itself, or a distortion occurring when the ball coupling is assembled, may be generated. In such a condition, it is difficult to properly adjust an axial gap between the first and second scroll members to achieve a desired performance of the compressor. Further, because it is difficult to place the balls at proper positions in the respective ball rolling grooves, the behavior of the balls is unstable. Subsequently unstable behavior of the balls will induce chipping of the plate or generation of noise.

SUMMARY OF THE INVENTION

It is an object of the present invention to provide an improved structure for a scroll-type compressor, which can properly adjust an axial gap between first and second scroll members, using a ball coupling as a rotation preventing mechanism for the second scroll member in which a ring for regulating balls and thrust races for receiving balls are made integrally.

It is another object of the present invention to provide an improved structure for a scroll-type compressor which can stabilize the behavior of the balls of the ball coupling during the operation of the compressor.

To achieve the foregoing and other objects, a scroll-type compressor according to the present invention is herein provided. The scroll-type compressor includes a first scroll member disposed within a housing and having a first end plate from which a first spiral element axially extends into an interior of the housing, and a second scroll member disposed for nonrotatable, orbital movement relative to the first scroll member within the interior of the housing and having a second end plate from which a second spiral element axially extends into the interior of the housing. The first and second spiral elements interfit at an angular and radial offset to make a plurality of line contacts which define at least one pair of sealed off fluid pockets for the compression operation of the compressor. The scroll-type compressor comprises a ball coupling provided as a rotation preventing mechanism for the second scroll member. The ball coupling has a pair of integrally formed rolling ball regulating plates and a plurality of balls disposed between the rolling ball regulating plates. The ball coupling is assembled in the scroll-type compressor in a condition that an axial preload is provided. The axial preload is more than an axial force given by the balls to the rolling ball regulating plates during operation of the scroll-type compressor, for correcting a deformation of the rolling ball regulating plates.

In the scroll-type compressor, the axial preload may remain in the ball coupling as a residual pressure source, even after the balls correct the deformation of the rolling ball regulating plates during operation of the scroll-type compressor.

The rolling ball regulating plates may have ring-like ball rolling grooves for receiving the balls on respective surfaces facing each other. The ball coupling is disposed between the second scroll member and a fixed portion of the scroll-type compressor, such as a portion of a front housing, in an axial direction of the scroll-type compressor.

The scroll-type compressor is incorporated into a refrigerating circuit. The residual pressure is within a range determined by a life of the scroll-type compressor, a coefficient of performance of a refrigerating cycle of the refrigerating circuit, and a volumetric efficiency of the scroll-type compressor.

In the scroll-type compressor according to the present invention, because a desired axial preload is given to the ball coupling, an axial gap between the first and second scroll members may be easily and properly adjusted, thereby, achieving a desired performance of the scroll-type compressor.

Moreover, because the balls correct the deformation of rolling ball regulating plates during the operation of the compressor and the residual axial preload remains even after the correction of the deformation, the behavior of the balls is stabilized, thereby, preventing chipping of the plate or generation of noise.

Further objects, features, and advantages of the present invention will be understood from the following detailed description of a preferred embodiment of the present invention with reference to the accompanying figures.

BRIEF DESCRIPTION OF THE DRAWINGS

An embodiment of the invention is described with reference to the accompanying figures, which are given by way of example only, and are not intended to limit the present invention.

DETAILED DESCRIPTION OF PREFERRED EMBODIMENTS

Figure 1:
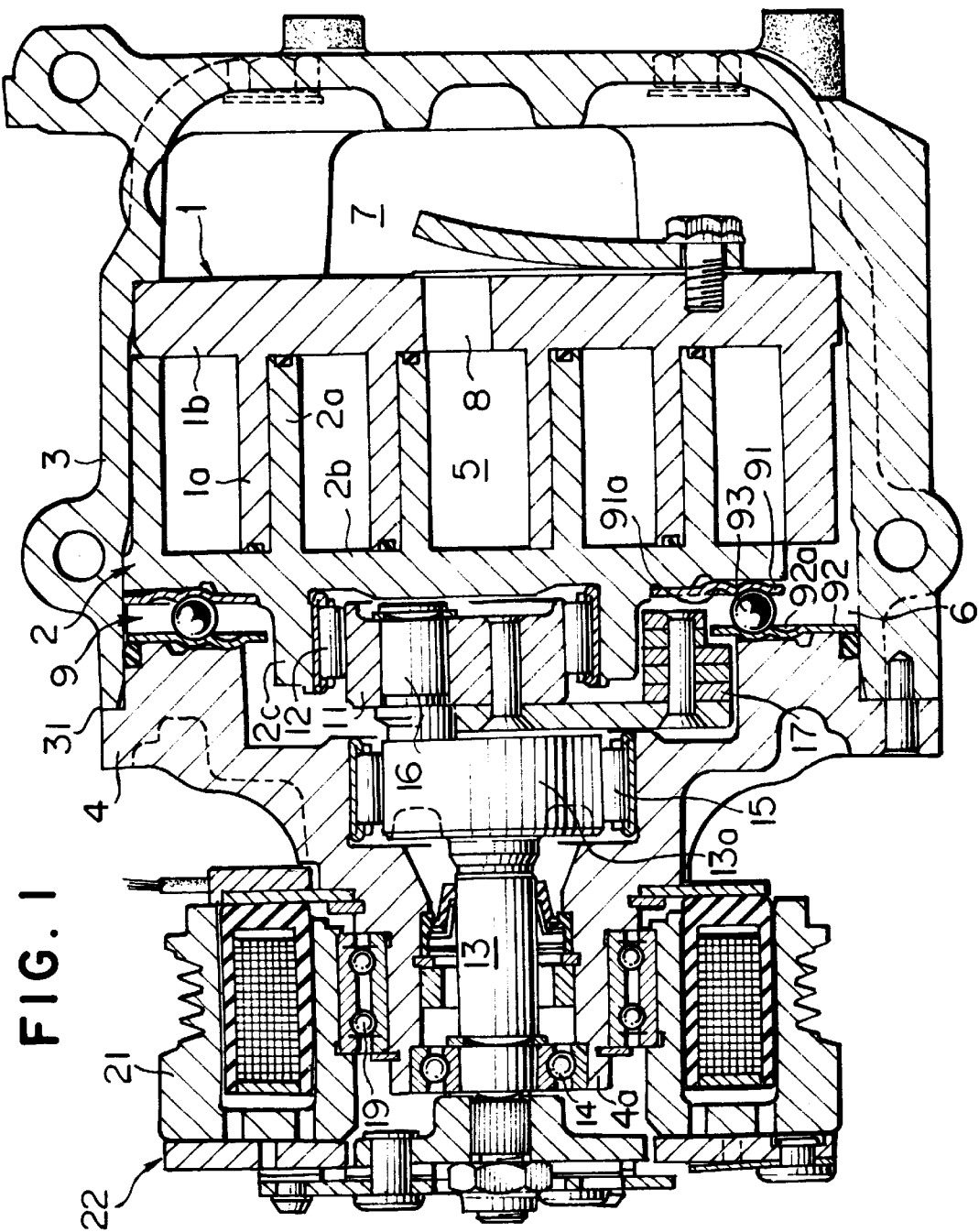
FIG. 1 is a vertical, cross-sectional view of a scroll-type compressor according to an embodiment of the present invention.

Referring to FIG. 1, a scroll-type compressor according to the present invention is provided. The illustrated scroll-type compressor is designed for use in an air conditioner for vehicles. The scroll-type compressor includes first scroll member 1, second scroll member 2 interfitted to first scroll member 1, housing 3 formed as a cup-like body and enclosing first scroll member 1 and second scroll member 2, and front housing 4 closing a front end of housing 3.

First scroll member 1 comprises first end plate 1b, and first spiral element 1a. First end plate 1b is formed as a circular plate. First spiral element 1a is formed along an involute curve. First spiral element 1a is provided on one surface of first end plate 1b, such that first spiral element 1a axially extends into the interior of housing 3. Second scroll member 2 comprises second end plate 2b, and second spiral element 2a. Second end plate 2b is formed as a circular plate. Second spiral element 2a is formed along the same involute curve as that of first spiral element 1a. Second spiral element 2a is provided on one surface of second end plate 2b, such that second spiral element 2a extends axially into the interior of housing 3. Second scroll member 2 is disposed for nonrotatable, orbital movement relative to first scroll member 1 within the interior of housing 3. First spiral element 1a of first scroll member 1 and second spiral element 2a of second scroll member 2 are interfitted at an angular and radial offset to make a plurality of line contacts, which define at least one pair of sealed off fluid pockets 5 between first spiral element 1a and second spiral element 2a.

Rotation preventing mechanism 9 is provided between the outer surface of second end plate 2b of second scroll member 2 and the inner surface of front housing 4. Rotation preventing mechanism 9 prevents the rotation of second scroll member 2 with respect to first scroll member 1, when second scroll member 2 moves in an orbital motion at a predetermined orbital radius around a center axis of first scroll member 1. Rotation preventing mechanism 9 will be described in greater detail later.

First end plate 1b of first scroll member 1 is fixed to housing 3. Discharge chamber 7 is formed between first end plate 1b of first scroll member 1 and inner surface of housing 3. Discharge port 8 is formed on first end plate 1b at the central portion of first end plate 1b. Fluid is sucked from suction chamber 6 into fluid pockets 5, compressed in fluid pockets 5 as a result of the movement of fluid pockets 5 in a radially inward direction, and the compressed fluid is then discharged into discharge chamber 7 through discharge port 8.

Ring-like projected portion 2c is provided on the surface of second end plate 2b of second scroll member 2 opposite to the surface of second spiral element 2a. Eccentric bush 11 is disposed in projected portion 2c via drive bearing 12.

Drive shaft 13, having a large diameter portion 13a, is disposed at a central position of housing 3. Drive shaft 13 is rotatably supported by shaft bearing 14, and its large diameter portion 13a is rotatably supported by main bearing 15. Large diameter portion 13a of drive shaft 13 has eccentric pin 16 that engages eccentric bush 11. Balancer 17 is provided to eccentric bush 11 at a position opposite to the position of eccentric pin 16 for balancing the moment during the operation of second scroll member 2.

Rotor 21 is rotatably supported on the outer surface of cylindrical portion 4a of front housing 4 via radial bearing 19. Rotor 21 is driven, for example, by an engine of a vehicle. Rotor 21 is connected to drive shaft 13 via electromagnetic clutch 22. When electromagnetic clutch 22 is turned on, shaft 13 rotates together with rotor 21. When electromagnetic clutch 22 is turned off, shaft 13 is separated from rotor 21.

When shaft 13 rotates, second scroll member 2 is driven in an orbital movement by the cooperation of eccentric pin 16 and eccentric bush 11. At that time, the rotation of second scroll member 2 is prevented by rotation preventing mechanism 9. Consequently, fluid pockets 5 move radially inward and compress the fluid therein, and the compressed fluid is discharged into discharge chamber 7 through discharge port 8. The compressed fluid in discharge chamber 7 is sent to a refrigerating circuit, and the circulated fluid in the refrigerating circuit is then returned to suction chamber 6.

Figure 2:
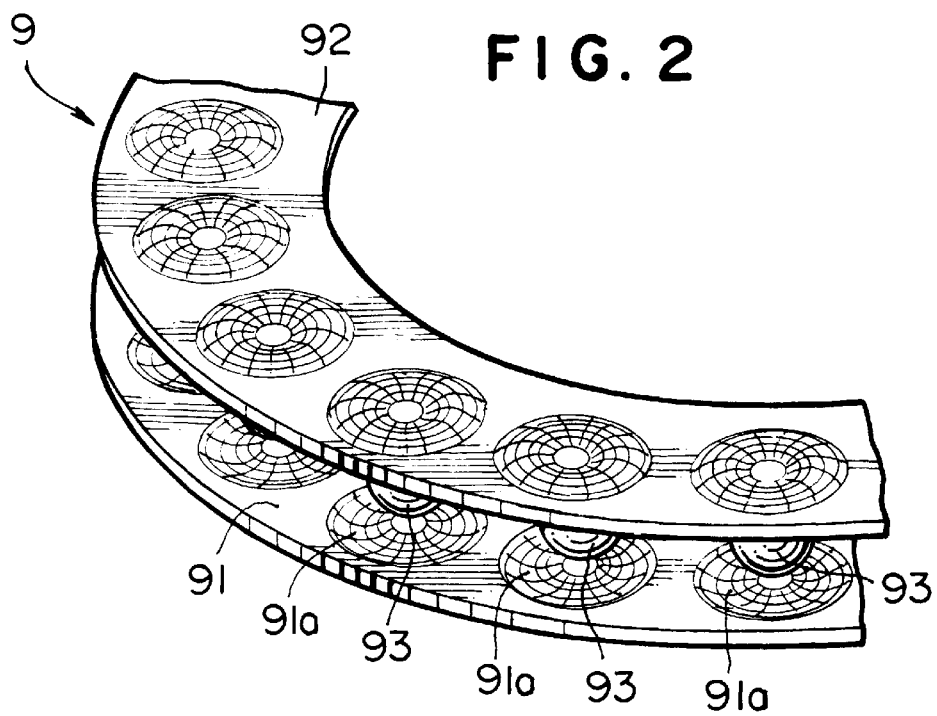
FIG. 2 is an enlarged, partial perspective view of a ball coupling used in the scroll-type compressor depicted in FIG. 1.

Next, rotation preventing mechanism 9 will be explained in more detail, referring also to FIG. 2.

Rotation preventing mechanism 9 is generally called "a ball coupling." Ball coupling 9 comprises a pair of rolling ball regulating plates 91 and 92, and a plurality of metal balls 93 interposed between rolling ball regulating plates 91 and 92. Each of rolling ball regulating plates 91 and 92 is made from a material having a high elasticity. Each of rolling ball regulating plates 91 and 92 is formed as an integrally formed plate. One rolling ball regulating plate 91 is fixed to second scroll member 2. Rolling ball regulating plate 92 is fixed to front housing 4. A plurality of ball rolling grooves 91a and 92a are provided, on the respective surfaces of rolling ball regulating plates 91 and 92, facing each other. Ball rolling grooves 91a and 92a are disposed in the circumferential directions about the respective rolling ball regulating plates 91 and 92. Each of ball rolling grooves 91a and 92a is formed as a ring-like groove. Each ball 93 is interposed between the corresponding ball rolling grooves 91a and 92a formed at substantially the same circumferential position. Each ball 93 rolls along ball rolling grooves 91a and 92a during the operation of the compressor.

Such a rotation preventing mechanism formed as ball coupling 9 has the advantage of requiring only a small number of parts. On the other hand, it has a problem that the behavior of balls 93 may not be stable, and that a distortion or a torsion of rolling ball regulating races 91 and 92 may occur from the viewpoints of the structure and the manufacture, as described before.

In the present invention, these problems are readily solved, because when the compressor is assembled, a specified axial preload is provided to ball coupling 9. This axial preload may be easily adjusted by determining the thickness of shim 31, that is interposed between housing 3 and front housing 4. When the thickness of shim 31 is increased, the axial preload decreases. When the thickness of shim 31 is decreased, the axial preload increases.

The setting of the axial preload to ball coupling 9 will be explained, by referring to FIG. 3, in the case of a scroll-type compressor being incorporated into a refrigerating cycle.

The amount of an axial preload is indirectly proportional to the thickness of shim 31. At the same time, the amount of an axial preload is directly proportional to a static shaft torque. Therefore, the amount of an axial preload is determined by measuring the static shaft torque.

Figure 3:
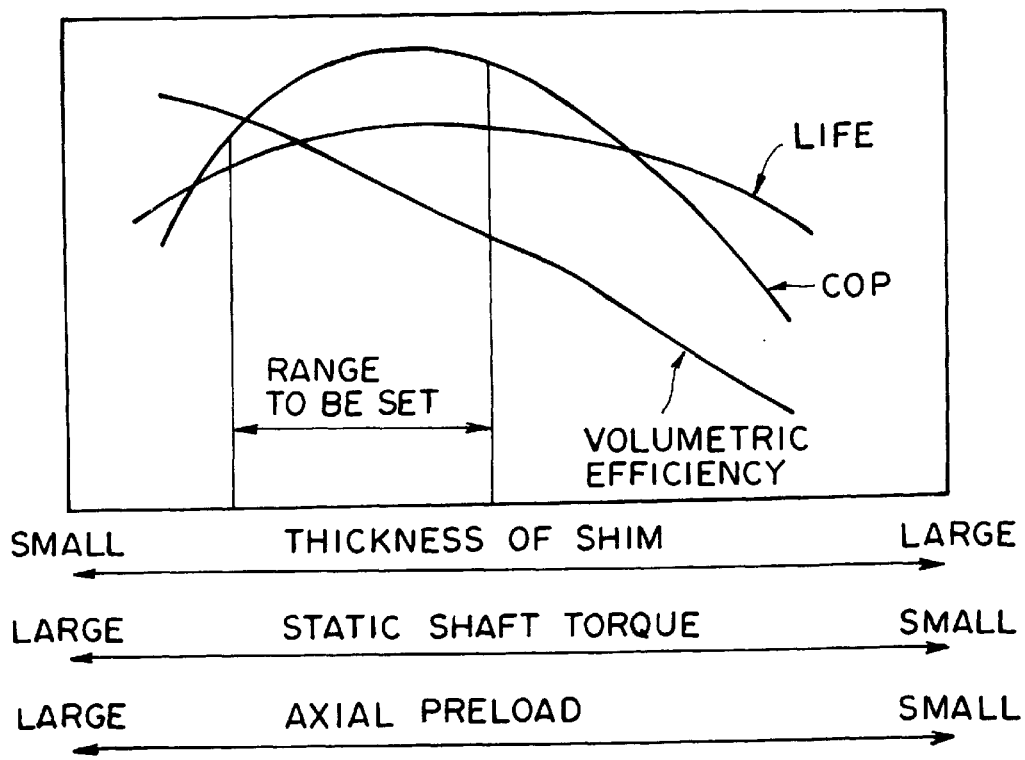
FIG. 3 is a graph of a range of an axial preload of the ball coupling to be set in the scroll-type compressor, depicted in FIG. 1.

Further, a life of the scroll-type compressor, a coefficient of performance (COP) of a refrigerating cycle of the refrigerating circuit, and a volumetric efficiency of the scroll-type compressor have respective relationships with the amount of an axial preload, as shown in FIG. 3. Therefore, a desired range for the amount of an axial preload to be set is determined in accordance with these relationships. Further, the desired range for the amount of an axial preload to be set is determined by an experiment for satisfying both the performance and the reliability of the compressor. The range to be set, that has been determined by the experiment, is controlled by a rotational torque when the shaft is rotated at the time of the assembly of the compressor, namely, the static shaft torque.

The axial preload is set so that a residual axial pressure may remain in the range shown in FIG. 3 even after balls 93 roll along ball rolling grooves 91a and 92a, thereby, correcting the deformation of rolling ball regulating plates 91 and 92. Particularly, the compressor is assembled at a condition where an axial preload, which is more than an axial force given for correcting the deformation of ball regulating plates 91 and 92 during the operation of the compressor, is provided to ball coupling 9, and after the correction, a residual axial pressure within the range, which is determined in accordance with a life of the scroll-type compressor, a coefficient of performance (COP) of a refrigerating cycle of the refrigerating circuit, and a volumetric efficiency of the scroll-type compressor, may remain.

In the present invention, because an adequate axial preload remains in ball coupling 9, the axial positional relationship between first scroll member 1 and second scroll member 2 (namely, the axial position of second spiral element 2a relative to first spiral element 1a) is accurately determined, and an axial gap therebetween is properly adjusted. Further, because the shapes of ball regulating plates 91 and 92 are appropriately corrected and an adequate preload remains therebetween, balls 93 are properly positioned in rolling ball grooves 91a and 92a, and the behavior of balls 93 is stable.

Although only one embodiment of the present invention has been described in detail herein, the scope of the invention is not limited thereto. It will be appreciated by those skilled in the art that various modifications may be made without departing from the scope of the invention. Accordingly, the embodiment disclosed herein is only exemplary. It is to be understood that the scope of the invention is not to be limited thereby, but is to be determined by the claims which follow.

What is claimed is:

1. A scroll-type compressor comprising:

a first scroll member disposed within a housing and having a first end plate from which a first spiral element axially extends into an interior of said housing;

a second scroll member disposed for nonrotatable, orbital movement relative to said first scroll member within the interior of said housing and having a second end plate from which a second spiral element axially extends into the interior of said housing, said first and second spiral elements interfitting at an angular and radial offset to make a plurality of line contacts which define at least one pair of sealed off fluid pockets; and a ball coupling provided as a rotation preventing mechanism for said second scroll member and having a pair of integrally formed rolling ball regulating plates and a plurality of balls disposed between said rolling ball regulating plates, said ball coupling being assembled in said scroll-type compressor at a condition in that an axial preload is provided, said axial preload being more than an axial force given by said balls to said rolling ball regulating plates during operation of said scroll-type compressor for correcting deformation of said rolling ball regulating plates.

2. The scroll-type compressor of claim 1, wherein said axial preload remains in said ball coupling as a residual pressure after said balls correct the deformation of said rolling ball regulating laces during operation of said scroll-type compressor.

3. The scroll-type compressor of claim 1, wherein said rolling ball regulating plates have ring-like ball rolling grooves for receiving said balls on respective surfaces facing each other.

4. The scroll-type compressor of claim 1, wherein said ball coupling is disposed between said second scroll member and a fixed portion of said scroll-type compressor in an axial direction of said scroll-type compressor.

5. The scroll-type compressor of claim 2, wherein said scroll-type compressor is incorporated into a refrigerating circuit, and said residual pressure is within a range determined in accordance with a life of said scroll-type compressor, a coefficient of performance of a refrigerating cycle of said refrigerating circuit, and a volumetric efficiency of said scroll-type compressor.

* * * * *

UNITED STATES PATENT AND TRADEMARK OFFICE
CERTIFICATE OF CORRECTION

PATENT NO.     : 6,231,325 B1
DATED          : May 15, 2001
INVENTOR(S)    : Norio Kitano et al.

It is certified that error appears in the above-identified patent and that said Letters Patent is hereby corrected as shown below:

<u>Title page,</u>
Item [73], after "(JP)", insert -- , and NTN Corporation, Osaka (JP) --.

Signed and Sealed this

Second Day of July, 2002

Attest:

JAMES E. ROGAN
Attesting Officer
Director of the United States Patent and Trademark Office